United States Patent [19]

Lury

[11] 4,456,180
[45] Jun. 26, 1984

[54] SPRAY NOZZLE ASSEMBLIES

[75] Inventor: Marcus Lury, Sutton, England

[73] Assignee: Lurmark Limited, Cambridgeshire, England

[21] Appl. No.: 300,186

[22] Filed: Sep. 8, 1981

[30] Foreign Application Priority Data

Sep. 29, 1980 [GB] United Kingdom ............... 8031387
Apr. 24, 1981 [GB] United Kingdom ............... 8112785

[51] Int. Cl.³ ............................................... B05B 1/30
[52] U.S. Cl. ................................... 239/397; 239/551; 239/586; 239/600
[58] Field of Search ............... 239/159, 390, 391, 397, 239/547, 551, 562, 570, 571, 583, 586, 600

[56] References Cited

U.S. PATENT DOCUMENTS

| | | | |
|---|---|---|---|
| 3,779,462 | 12/1973 | Bruninga | 239/390 X |
| 3,863,841 | 2/1975 | Berthoud | 239/551 X |
| 4,058,260 | 11/1977 | Lestradet | 239/600 X |
| 4,185,781 | 1/1980 | O'Brien | 239/600 |
| 4,191,332 | 3/1980 | De Langis et al. | 239/586 X |

Primary Examiner—Andres Kashnikow
Attorney, Agent, or Firm—Gifford, Van Ophem, Sheridan, Sprinkle & Nabozny

[57] ABSTRACT

A spray nozzle system including a modular nozzle assembly comprising a liquid inlet unit having at least one tail pipe for connection of a flexible hose and a clamp enabling the liquid inlet unit to be clamped to a dry spray bar at a freely selected position therealong, an alternative liquid inlet unit having a liquid inlet pipe and a clamp enabling the unit to be clamped to a wet spray bar with the inlet pipe sealingly engaging an aperture in the bar, a check valve unit and a spray nozzle unit, either of the valve unit and the nozzle unit being connectible to either one of the two inlet units and the spray unit being connectible to the check valve unit.

4 Claims, 9 Drawing Figures

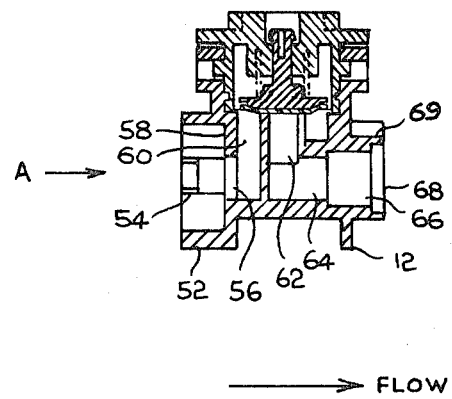
Fig. 4
Fig. 5
FLOW
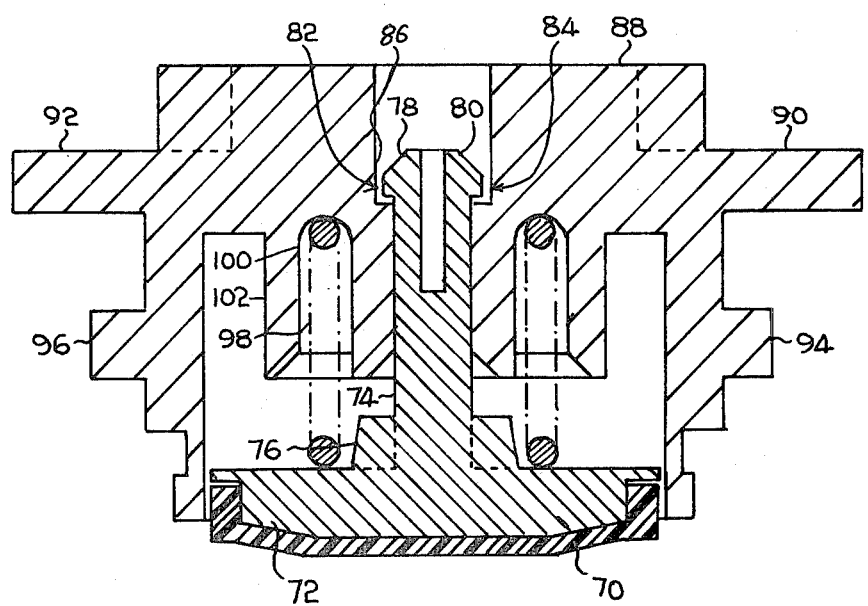
Fig. 6

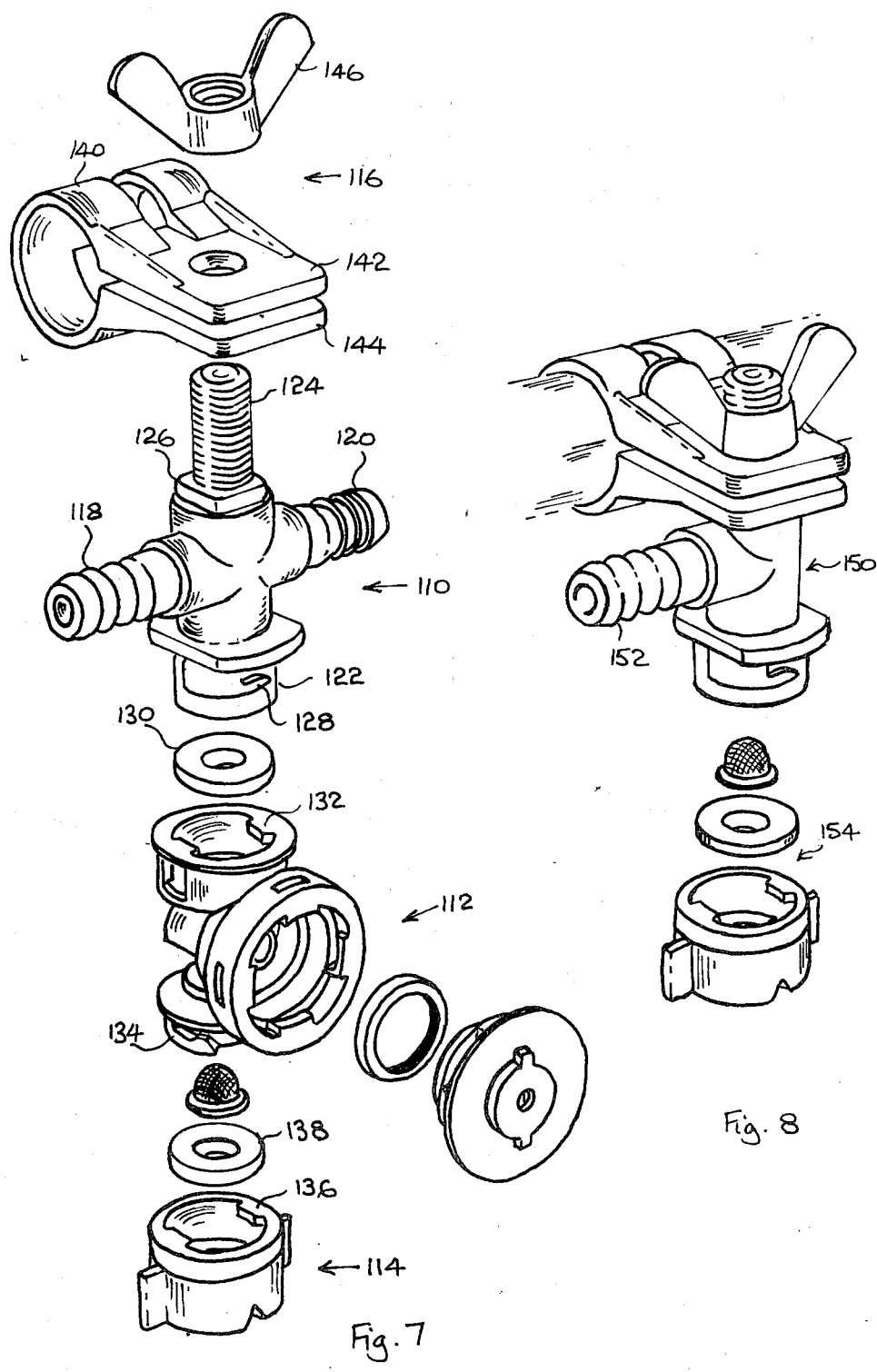

SPRAY NOZZLE ASSEMBLIES

FIELD OF INVENTION

This invention concerns spray nozzle assemblies particularly for use in agriculture and horticulture.

BACKGROUND TO THE INVENTION

It is known to provide a horizontal spray bar on an agricultural vehicle and to supply liquid fertilizer or weed inhibitor to the spray bar under pressure for spreading the liquid medium over the ground as the vehicle progresses. Such a spray bar used for supply of the liquid to the nozzles may be termed a wet spray bar.

With many present day chemicals, it is necessary to control accurately the quantity of liquid applied to the ground per unit area and, to this end, it is necessary to use finely calibrated nozzles and to maintain a constant head of pressure so that a well-defined rate of flow can be obtained.

The pressure along the wet spray bar would decrease if the nozzles were fed directly from the interior of the spray bar and, to this end, it is known for an individual constant pressure flow control valve to be provided in the fluid coupling between the spray bar and each nozzle served by the bar. The provision of such constant pressure flow control valves ensures that a uniform pressure is applied to the nozzles and constant rates of flow can thus be obtained. Equally, however, if the nozzles are separately supplied with liquid under pressure, when mounted on a boom (dry spray bar), the provision of constant pressure flow control valves may nevertheless be desirable.

OBJECTS OF THE INVENTION

It is sometimes necessary to change the operating pressure of the nozzles and, to this end, one object of the present invention is to provde an improved design and construction of constant pressure flow control valve, conveniently of modular form.

The rate of flow is largely controlled by the size of the nozzle orifice and since different chemicals require different rates of application it is common practice to provide a plurality of differently sized orifice nozzles for a spray bar and to allow for the differently sized nozzles to be replaced at will. Thus, another object of the present invention is to provide an improved design and construction of modular assembly by which the nozzles can be fitted to a wet or dry spray bar, with or without the check valves.

The spray nozzles may be arranged to provide a fan spray and when the nozzles are so arranged, it is important that the nozzles are aligned correctly along the spray bar or other mounting means. Another object of the invention is to achieve self alignment of fan spray nozzles and the prevention of impingement of one spray pattern on an adjoining spray pattern.

Where differently sized nozzles are adapted to be fitted to a single spray bar so as to provide for different rates of application, it is important to ensure that wrongly sized nozzles are not fitted by accident, and another aspect of the invention provides for easy identification of differently sized nozzles to avoid the risk of incorrectly sized nozzles being fitted. Since the nozzles may sometimes have to be fitted in adverse conditions and interchanged while the spraying equipment is at least partially filled with chemicals some of which are caustic, or produce unpleasant side effects, the operator may often have to change nozzles while still wearing protective clothing, and another object of the present invention is to enable relevant parts of the nozzles and of the constant pressure flow control valves to be replaced by an operator while still wearing protective clothing.

Again, in some instances, for example where agrochemicals are to be used in connection with vegetable crops, it is desired to spray either the crop and not the intervening land or vice versa. Cost saving alone may necessitate such selective spraying, although clearly other reasons can sometimes arise. In these instances, it can be disadvantageous that only a fixed span and fixed distribution of spray nozzles is available, and it is yet another object of this invention to provide a solution to the problem created by the requirement for selective spraying.

THE INVENTION

According to one aspect of the present invention, there is provided in a spray nozzle system a check valve for supplying liquid under pressure to a spray nozzle, wherein a diaphragm is stretched across inlet and outlet apertures and is urged in the direction so as to close off the inlet aperture from the outlet aperture by spring means so that the liquid pressure has to exceed a given value before the liquid can pass to the nozzle and wherein the diaphragm is in the form of a shallow dish having a circumferential annular wall and is adapted to be fitted over the end of a cylindrical housing containing the said spring means with a radially outer annular region of the diaphragm trapped between an annular shoulder on the cylindrical housing and a cylindrical seating containing the said inlet and outlet apertures.

In one embodiment of check valve the seating is generally circular and defines a cylindrical member which constitutes a fluid inlet and the outlet constitutes a concentric cylindrical tube of reduced diameter, the end of the open end of the cylindrical tubular member being substantially coplanar with the open end of the cylindrical housing constituting the said inlet so that the diaphragm, when stretched thereacross closes off the central outlet from the annular opening defining the said inlet aperture.

The spring means may act through the intermediary of a convexly shaped thrust plate and the central and slightly protruding region of the thrust plate aligns with the central reduced diameter exit tube and the diaphragm is thrust in a generally downward direction by the said spring means and thrust plate so as to firmly engage the central tubular fluid outlet and the spring means has to be compressed before the outer radial regions of the diaphragm can be brought into contact with the outer wall of the cylindrical housing forming the inlet.

The thrust member may be formed with a central spigot which is bifurcated and formed with at least two barb like projections for engaging a shoulder in a central bore within the cylindrical member containing the spring means to facilitate the assembly of the unit. To this end a compression spring is situated around the central member containing the bore and shoulder which will retain the barbed bifurcated end of the spigot and the spigot is introduced through the spring means and into the aperture and pushed beyond the shoulder so that the barb like projections spring out and engage the said shoulder.

The thrust plate can still be pushed in an inward direction against the spring means but is prevented from moving outwardly by more than the distance governed by the inter-engagement of the barb like projections and the said shoulder.

According to another feature of the valve of this invention, the cylindrical member is itself formed with diametrically opposed lugs which are adapted to be easily gripped between finger and thumb even when wearing a protective glove, and a bayonet fastening is provided between the cylindrical member and a cylindrical extension of the same member containing the inlet and outlet apertures so that the said cylindrical member containing the spring means and to which the diaphragm is attached can be readily fitted thereto or removed therefrom simply by an appropriate twist preferably through approximately 90° or less.

The color of at least a part of the cylindrical member containing the spring means or the cylindrical member into which it is fitted may be colored in a distinctive color the choice of which is determined by the strength of the spring located therein. In this way it is possible to identify quickly and easily whether all the check valve units fitted to a spray bar are the same and the correct rating for a particular job in hand.

According to another aspect of the invention, the spray nozzle is itself contained within a housing which is adapted with a bayonet connection between it and a mounting surrounding an outlet from the check valve previously described so that the mounting or demounting of the nozzle unit from the check valve unit can be achieved by rotating the former preferably through 90° or less.

The nozzle housing may then also include a pair of diametrically opposed lugs or ears which can be clipped readily between finger and thumb to allow the nozzle assembly to be rotated for mounting or demounting even when the operator is wearing a protective clothing glove.

Preferably, the mounting of the jet and selection of the angle of aim of the jet relative to the axis about which the nozzle is fitted to the check valve outlet is related to the bayonet connections so that when fitted to the check valve outlet and firmly rotated into the locked-on position of the bayonet coupling, the orifice within the nozzle will direct a jet of liquid in a predetermined direction. In this way a plurality of fan spray nozzles can always be mounted consistently so that the adjoining patterns do not interfere and are correctly aligned and where individual sprays are required, the deflection of each is consistent.

Furthermore, at least part of each spray nozzle or the surrounding housing thereof is formed in a distinctive color so as to indicate the size of the nozzle or some other feature of the orifice such as direction of the jet or the extent of any fan spread associated with the nozzle so that a check on the size and other characteristics of the nozzles can readily be made in situ.

According to another aspect of the invention, the check valve is situated intermediate clamping means in the form of a bracket for attaching the check valve to a pipe containing liquid under pressure (wet spray bar) and a mounting for the nozzle unit at the opposite end. The bracket conveniently includes a generally semi-cylindrical recess for fitting around the pipe and includes a reduced diameter tubular nozzle which extends generally centrally into the semi-cylindrical recess and is surrounded by a resiliently deformable seal such as a rubber ring seal for fitting through an aperture in the wall of the pipe containing liquid under pressure. Conveniently another part of the bracket which cooperates with the first part so as to surround the pipe is adapted to be secured to the first mentioned part of the bracket and quick release means is provided for securing the two halves of the bracket together so as to clamp the bracket around the pipe. The said means may comprise screw threaded members such as bolts or may comprise clips or cams or levers or bayonet type connectors.

All of the parts of the check valve and the nozzle assembly and the bracket are preferably formed from injection molded plastics material with the exception of the diaphragm which is preferably formed from a rubber, plastics or composite material or a material such as nitrial or viton and the jet defining orifice which may itself be formed from metal.

Where bolts are used for securing the two bracket halves together or other screw threaded members, these may, of course, be formed from metal.

It is to be understood that the spring means urging the diaphragm into its closed position will normally be a helical spring or spring steel or the like but may alternatively be formed from rubber.

The use of a cap shaped diaphragm, i.e. a diaphragm having an upstanding annular wall and an integral circular membrane provides the following advantages:

1. Positive location and sealing of the diaphragm,
2. Speedy replacement of the diaphragm in the field should failure occur,
3. Positive shut-off at closely defined predetermined pressures,
4. The use of lower system pressures,
5. Stressing of the diaphragm only when the unit is operated (due to the diaphragm shape), and
6. Air operation as well as manual operation since the diaphragm is circumferentially sealed.

In accordance with yet another aspect of the present invention, there is provided a spray nozzle comprising a liquid inlet unit having a tail pipe or tail pipes for connection for a flexible hose, clamping means enabling said liquid inlet unit to be clamped to a dry spray bar at a freely selected position therealong, and a nozzle unit connectible to the liquid inlet unit.

Preferably, by use of uniform bayonet-type fittings, the nozzle unit is either directly connectible to the liquid inlet unit, or is connectible to the outlet side of the above-described check valve unit having its inlet side connectible to the liquid inlet unit.

The clamping means is preferably a split ring-type clamp having an aperture freely receiving a threaded boss on the liquid inlet unit, with a wing nut or like preferably finger-operable fastener for screwing to said boss. Tightening the wing nut preferably not only secures the liquid inlet unit to the clamp but also tightens the ring clamp to the dry spray bar.

The liquid inlet unit may have a square or like polygonal section at the base of the threaded boss, this being received in a correspondingly shaped recess in the clamp to ensure that the liquid inlet unit assumes a given orientation relative to the length of the dry spray bar. In such given orientation, for example, the tail pipe or tail pipes will preferably lie parallel to the spray bar, and the one part of the bayonet-type fitting on the liquid inlet unit will be disposed so that, when the nozzle unit (or check valve unit and nozzle unit) are attached, a shaped spray such as a fan spray is provided for in a chosen direction relative to the length of the spray bar. This chosen direction of spray, and likewise the shape of the spray, may of course be adjustable on the nozzle unit itself, but it is advantageous to be able to avoid the necessity for such adjustment each time a nozzle is moved on the spray bar.

This aspect of the present invention enables the nozzles to be arranged in spaced groups on a dry spray bar, to give one example, thereby to enable rows of vegetables to be sprayed with minimum wastage of chemical on the intervening strips of land. This spray bar is referred to as a dry spray bar to distinguish from the wet spray bar or liquid carrying spray line previously referred to.

According to another aspect of the present invention there is provided a dry spray bar having adjustably clamped thereto a plurality of spray nozzles each comprising a liquid inlet unit having one or more tail pipes for connection of a flexible hose and a nozzle unit connectible to said inlet unit, and flexible hoses interconnecting said liquid inlet units for conveying thereto a liquid chemical to be sprayed through the nozzle units.

More generally, therefore, the present invention provides a spray nozzle system comprising a liquid inlet unit which includes means enabling said unit to be clamped to a spray bar, a check valve unit and a nozzle unit, wherein said units are provided with matching, interengaging fittings enabling said nozzle unit to be connected to the inlet unit either directly or through the intermediary of said check valve unit.

The liquid inlet unit may be the first described bracket means for fitting to a wet spray bar or the subsequently described inlet unit adapted to be fitted to a dry spray bar and fed with liquid through a flexible hose. The above-described nozzle unit (spray nozzle) may fit detachably either directly or through the check valve to either of said inlet units, by virtue of the said matching bayonet-type or other matching, interengaging fittings.

BRIEF DESCRIPTION OF DRAWINGS

The invention will now be described by way of example with reference to the accompanying drawings in which:

FIG. 4 is a cross-section through the check valve assembly which is located intemediate the supply pipe and the nozzle, FIG. 5 is an end view in the direction of arrow 'A' in FIG. 4 and shows how the check valve assembly can be secured to one of the brackets, FIG. 6 is an enlarged scale cross-section through the check valve assembly shown in FIG. 4, FIG. 7 is an exploded view of a twin inlet, alternative spray nozzle assembly, and FIG. 8 shows a single inlet, alternative spray nozzle assembly attached to a dry spray bar, with a nozzle module in exploded view.

DESCRIPTION OF EMBODIMENTS

Figure 1:
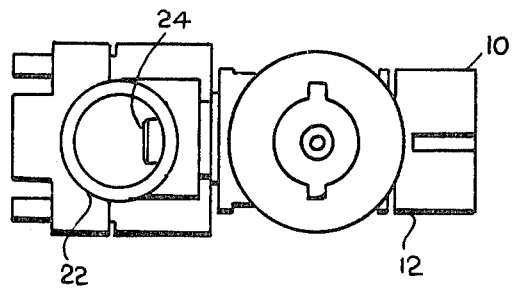
FIG. 1 is a side elevation of a nozzle holder and check valve assembly mounted on a supply pipe (wet spray bar)
Figure 2:
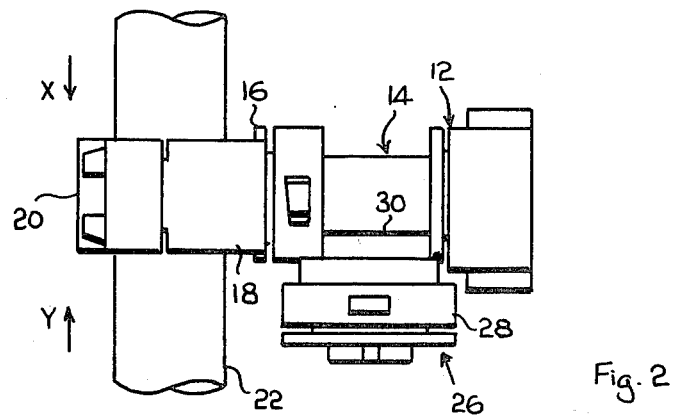
FIG. 2 is a plan view of the assembly shown in FIG. 1.

FIGS. 1 and 2 show a complete nozzle and check valve assembly mounted on a supply pipe (wet spray bar).

The assembly comprises a nozzle spray unit in the form of a nozzle tip nut 10 containing an orifice (not shown) through which liquid is forced under pressure to form a fine spray. The nut 10 is formed with a bayonet connection (not shown but see FIGS. 7 and 8) for fitting to a complementary bayonet connection formed in the end face 12 of a housing 14. The latter includes at the opposite end another flange 16 having another bayonet or similar connection by which it is secured to one half 18 of a two part bracket (nozzle inlet unit) the other part of which 20 is secured thereto in a manner to be hereinafter described.

The two part bracket surrounds a pipe 22 which contains a liquid under pressure such as a fertilizer or weed killer or the like. The transfer of the liquid in the pipe to the orifice (not shown) in the nozzle tip nut 10 is by means of tapering tubular probes one of which is shown at 24 protruding into the interior of the pipe 22 in FIG. 1.

Intermediate the nozzle tip nut 10 and the bracket member 18 is located a check valve assembly or check valve unit generally designated by reference numeral 26. The check valve assembly 26 includes a removable cap 28 secured by a bayonet fitting (not shown but see FIGS. 7 and 8) to a laterally extended housing 30 extending from the cylindrical housing 14. The check valve will be described in more detail with reference to the later Figures.

The purpose of the check valve is to inhibit the flow of liquid from the pipe 22 to the nozzle orifice except when the pressure in the pipe 22 is greater than a given value.

Figure 3:
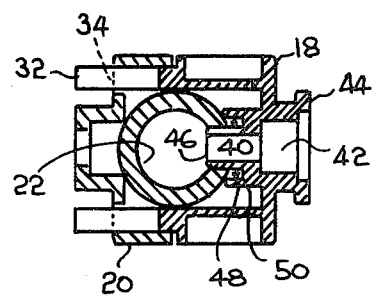
FIG. 3 is a cross-section view through the two part bracket which secures the check valve and nozzle assembly on to the supply pipe.

The communication between the housing 14 and the inside of the pipe 22 is best seen with reference to FIG. 3 which shows the two bracket halves in cross-section around the pipe 22. The bracket part 18 includes four upstanding arms one of which is designated by reference numeral 32 which is best shown in FIG. 2 including an enlarged head having a shoulder, the position of which is shown in dotted outline at 34 in FIG. 3. The bracket portion 20 is secured to the bracket portion 18 by pushing the arms 32 through slots formed on opposite sides of the member 20 until enlarged heads at the remote ends of the arms 32 overlie the edges of the slots so as to prevent the two parts from moving apart. It is a simple matter to squeeze the heads together in the direction of the two arrows 'X' and 'Y' in FIG. 2 so as to disengage the overhanging shoulders such as 34 and allow the part 20 to be slid along the arms away from the part 18 to split the joint.

Figure 3A:
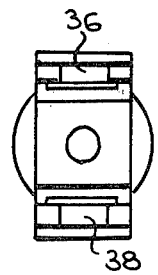
FIG. 3A is an end view of the two part bracket shown in FIG. 3.

FIG. 3a shows the heads of the arms in the two slots denoted by reference numerals 36 and 38.

Communication with the interior of the pipe 22 is achieved through the bore 40 and enlarged diameter bore 42. A bayonet flange 44 surrounds the opening to the bore 42. It is to this bayonet flange that the left-hand end of the housing 14 is attached.

The pipe 22 includes apertures along its length through the wall thereof through which the tubular probe 46 will fit and 'O' ring seals 48 which surround the probe 46 (24 in FIG. 1) serve to seal the latter to the pipe 22.

The resilience of the material forming the two halves of the bracket 18 and 20 is selected so as to be sufficient to grip the pipe firmly when the two bracket parts are firmly secured together and in turn the dimensions of the internal integral collar 50 containing the bore 40 are selected so that, when the bracket part 18 is firmly clamped to the bracket part 20, the seal 48 is compressed into sealing engagement with the wall of the pipe 22.

FIG. 4 is a cross-section viewed through the main body of the check valve and mounting part for attaching to the bracket at the left-hand end and the nozzle tip at the right-hand end as shown in FIG. 1.

The left-hand end 52 is adapted to fit over and around the bayonet flange 44 (see FIG. 3) and a central cylindrical tubular connection 54 communicates with the bores 40 and 42 when the two parts are securely joined together.

An aperture 56 in an internal wall 58 communicates with an annular region 60 within the housing, the axis of which is perpendicular to the general axis of the bayonet fitting formed by the parts 44 and 52.

The upper part of the annular region 60 constitutes an inlet aperture for a check valve and a central concentric reduced diameter tube 62 constitutes the outlet aperture from the check valve and this communicates with a series of bores 64 and 66 which terminate in an aperture 68 which constitutes the male portion 69 of a bayonet fitting the female portion of which is contained on the nozzle tip nut 10 to allow the latter to be fitted thereto.

Details of the nozzle tip 10 are not given since it essentially comprises nothing more than a quick release collar containing a concentric central aperture through which liquid under pressure can flow to an outlet orifice in the end face of the collar.

Detail of the check valve assembly is obtained from the enlarged scale drawing of FIG. 6.

This latter illustrates a complete sub-assembly which can be fitted quickly at will to the intermediate housing section 14 in FIG. 2 and constitutes the closure member for the check valve assembly.

The main sealing member is a cap shaped diaphragm 70 which is stretched across and around the outer rim of a slightly convexed thrust plate 72 which on its rearward face contains a central spigot 74 surrounded at its lower end by an enlarged collar 76.

The upper end of a spigot is bifurcated and two barb like heads are formed at the upper end thereof, the two heads in cross-section being denoted by reference numerals 78 and 80. The heads overlie shoulders 82 and 84 formed in the upper end of the bore through which the spigot is pushed and prevent the spigot from being pulled rearwardly therethrough.

The bore containing the heads which itself is denoted by reference numeral 86 is contained centrally within a cylindrical housing 88 which latter includes radially oppositely directed lugs or ears 90 and 92 and also includes bayonet flanges 94 and 96 by which the sub-assembly can be quick release fitted to the right-hand end of the intermediate housing 14 of FIGS. 1 and 2.

The thrust plate 72 is urged in a generally downward direction as shown in FIG. 6 under the action of a helical compression spring 98. This latter is located in an annular slot 100 formed in a central cylindrical region 102 within the overall member 88 and a degree of axial alignment is provided for by arranging that the internal diameter of the spring 98 is just fractionally greater than the external diameter of the collar 76.

The shape of the underside of the thrust plate 72 is chosen so that the central and slightly more protruding region pushes the diaphragm 70 into contact therewith so as to close off the central exit 62.

Movement of the thrust plate 72 in an upward direction as shown in FIG. 6, lifts the diaphragm 70 off the tubular member 62 and allows liquid to flow from the outer annular space 60 into the inner tubular member 62 and from thence to the outlet nozzle orifice.

Although one size of bracket 20 is shown in the drawings, two or more brackets may be provided and the curved recesses formed therein and in the cooperating end 18 to accommodate different diameter pipes such as 22.

The described modular design enables fitment of a standard liquid inlet nozzle holder, subsequent attachment of a diaphragm operated anti-drip device (D.C.V.) in the form of a second module by removing the existing spray nozzle, fitting the D.C.V. device in its place and replacing the spray nozzle on the appropriate end of the D.C.V. device.

The spray nozzle of FIG. 7 again essentially comprises a liquid inlet module 110, a check valve module 112 and a nozzle module 114.

The check valve module 112 and the nozzle module 114, the latter including a filter cup, are essentially as previously described with reference to FIGS. 1 to 6. The modified system of FIGS. 7 and 8 primarily concerns the liquid inlet module 110 and its clamping means, the latter generally designated 116.

The liquid inlet module comprises a connector having twin inlets in the form of oppositely directed tail pipes 118, 120 suited to connection of a flexible hose (not shown), and an outlet 122 coplanar with the inlets and perpendicular thereto. Opposite the outlet 122 is a threaded boss 124 having a squared-section 126 at its base.

It will be noted that the outlet 122 includes one part 128 of a bayonet type connection which enables the liquid inlet module 110 to be connected through a sealing washer 130 to a cooperating part 132 of the bayonet type connection provided on the check valve module 112. Likewise, parts 134, 136 of a second, similar, bayonet type connection, respectively provided on the check valve module 112 and the nozzle module 114, enable these two modules to be secured together through a sealing washer 138.

The clamping means 116 comprises a clamp of the split ring-type, having a ring 140 which can be squeezed to grip a dry spray bar or boom and apertured wings 142, 144 which freely receive the threaded boss 124 on the liquid inlet module 110 to enable a wing nut 146 to be screwed on to said boss 124 and tightened to secure the liquid inlet module 110 to the clamp and at the same time to squeeze the clamping ring tight on the spray bar.

The apertured wing 144 of the clamp has a squared recess (not shown) which receives the squared section 126 at the base of the boss 124 on the liquid inlet module 110 thereby to locate the liquid inlet module 110 in a chosen orientation relative to the length of the spray bar. Desirably, the tail pipes 118, 120 for connection of flexible hose will then be parallel to the length of the spray bar. Additionally, however, the bayonet type fittings will assume set positions, which is desirable for the reason previously explained.

FIG. 8 shows a modified spray nozzle having a liquid inlet module 150 with a single inlet 152, and a nozzle unit 154 for connecting directly to said liquid inlet unit, i.e. the check valve is omitted. This alternative arrangement is readily made possible by the modular assembly of the spray nozzle enabled by the uniform bayonet type fittings. The check valve may be omitted, for example, if an adequate liquid supply pressure is assuredly available even for the nozzles most remote from the supply.

It will readily be apparent that this aspect of the invention enables spray nozzles to be positioned in any desired distribution along a dry spray bar or boom, according to requirements. A regular distribution is available for overall, uniform, spraying; likewise a non-uniform distribution is available for selective spraying. As the nozzles are supplied with liquid through flexible hose detachably connecting to the liquid inlet units, it is practicable to connect up only some of the nozzles if desired, without detaching the unused nozzles from the spray bar. This facility enables the possibility of denser or less dense spraying, and enables overspraying more readily to be avoided. Movement of the nozzles is readily enabled by the finger operable wing nuts, without requiring the operator to remove protective clothing. As far as the modular assembly of the nozzle is concerned, the same check valve modules and spray nozzle units are usable not only with the liquid inlet units of FIGS. 7 and 8, but also with the liquid inlet nozzle holder described in connection with FIGS. 1 to 6. Thus, the complete system provides common modular units (check valves and spray nozzles) for use both with inlets clamping to a wet spray bar and with inlets clamping to a dry spray bar.

I claim:

1. A spray nozzle system comprising a liquid inlet unit which includes means enabling said unit to be clamped to a spray bar, a check valve unit and a nozzle unit, wherein said units are provided with matching, interengaging fittings enabling said nozzle unit to be connected to the inlet unit either directly or through the intermediary of said check valve unit, wherein the liquid inlet unit has clamping means enabling its attachment at any point along the length of a dry spray bar, said inlet unit also having at least one tail pipe for connection of a flexible hose through which liquid under pressure is supplied to said inlet unit, and wherein the inlet unit comprises a body having an axial outlet provided with one of said matching, interengaging fittings, at least one lateral inlet constituted by said at least one tail pipe and an axial threaded boss opposite the outlet, the inlet unit also comprising a split ring clamp having an aperture freely receiving said threaded boss, whereby the screwing of a nut on to the boss both secures the said body to the clamp and the clamp to the spray bar.

2. A spray nozzle system according to claim 1, wherein the said body has a polygonal section at its base for engagement with an aperture of corresponding shape in the ring-type clamp.

3. In a spray nozzle system, a modular nozzle assembly comprising a liquid inlet unit having at least one tail pipe for connection of a flexible hose and clamping means enabling said unit to be clamped to a dry spray bar at a freely selected position therealong, an alternative liquid inlet unit having a liquid inlet pipe and clamping means enabling said unit to be clamped to a wet spray bar with said inlet pipe sealingly engaging an aperture in said bar, a check valve unit and a spray nozzle unit, either of said valve unit and said nozzle unit being connectible to either one of said two inlet units and said nozzle unit being connectible to said check valve unit.

4. The invention according to claim 3, wherein said spray nozzle system further comprises means whereby in all instances the clamping of the inlet unit to the spray bar automatically predetermines a positive location for the nozzle unit such that it is directed with a predetermined orientation relative to the spray bar.

* * * * *